United States Patent [19]

Tippmann et al.

[11] Patent Number: 5,203,258
[45] Date of Patent: Apr. 20, 1993

[54] APPARATUS FOR HEATING FOOD ARTICLES

[76] Inventors: Vincent P. Tippmann, 8605 N. River Rd., New Haven, Ind. 46774; Joseph R. Tippmann, HRC-33, Box 8419, Rapid City, S. Dak. 57701

[21] Appl. No.: 833,607

[22] Filed: Feb. 12, 1992

Related U.S. Application Data

[63] Continuation of Ser. No. 581,548, Sep. 12, 1990, abandoned.

[51] Int. Cl.⁵ ........................ A23L 1/00; A47F 10/06
[52] U.S. Cl. ........................ 99/483; 34/197; 34/200; 62/520; 99/467; 126/20; 165/919; 219/401; 312/236
[58] Field of Search ............ 62/252, 253, 520, 521, 62/522; 34/194, 196, 197, 198, 200; 99/330, 331, 333, 467, 468, 483, 448, 470, 422; 165/2, 3, 48.1, 168, 104.26, 918, 919; 312/236; 126/369, 369.2, 21 R, 21 A, 374, 378, 20, 390; 219/385, 386, 387, 400, 401; 426/506

[56] References Cited

U.S. PATENT DOCUMENTS

| 209,146 | 10/1878 | Sweetland | 34/198 X |
| 214,728 | 4/1879 | Sweetland | 34/198 |
| 220,189 | 9/1879 | Sweetland | 34/198 X |
| 413,125 | 10/1889 | Bard | 34/198 |
| 508,113 | 11/1893 | Monteith | 34/198 X |
| 622,626 | 4/1899 | Howl | 34/197 X |
| 631,214 | 8/1899 | Howl | 34/197 X |
| 640,936 | 1/1900 | Parsons | 34/198 X |
| 768,438 | 8/1904 | Feathers | 34/200 |
| 946,843 | 1/1910 | Hurley et al. | 34/192 X |
| 1,331,658 | 2/1920 | Maltman | 34/193 X |
| 1,380,489 | 6/1921 | McLaughlin | 99/483 X |
| 2,168,367 | 8/1939 | Kucher | 62/520 X |
| 2,172,129 | 9/1939 | Philipp | 62/520 |
| 3,744,474 | 7/1973 | Shaw | 126/20 |
| 4,210,675 | 7/1980 | Liebermann | 99/483 X |
| 4,224,862 | 9/1980 | Liebermann | 99/331 |
| 4,278,697 | 7/1981 | Liebermann | 426/506 |
| 4,281,636 | 8/1981 | Vegh et al. | 99/467 X |
| 4,345,143 | 8/1982 | Craig | 312/236 X |
| 5,069,273 | 12/1991 | O'Hearne | 219/386 X |
| 5,086,693 | 2/1992 | Tippmann et al. | 99/468 X |

FOREIGN PATENT DOCUMENTS

| 17720 | 8/1896 | United Kingdom | 34/198 |
| 16717 | 8/1908 | United Kingdom | 126/20 |

Primary Examiner—Philip R. Coe
Assistant Examiner—Charles Cooley
Attorney, Agent, or Firm—Joseph J. Baker

[57] ABSTRACT

An apparatus for heating food articles including a chamber containing a plurality of vertically, spaced-apart supports, each having a hollow interior which is interconnected by a single conduit. A thermostatically controlled steam generator is connected to the single conduit serving to both transmit steam to the supports and return condensate water back to the steam generator to thereby heat the food articles.

3 Claims, 1 Drawing Sheet

U.S. Patent    Apr. 20, 1993    5,203,258
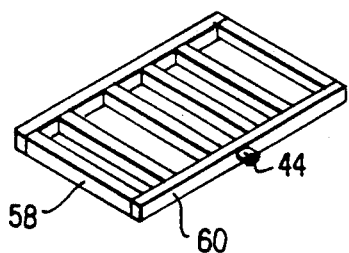
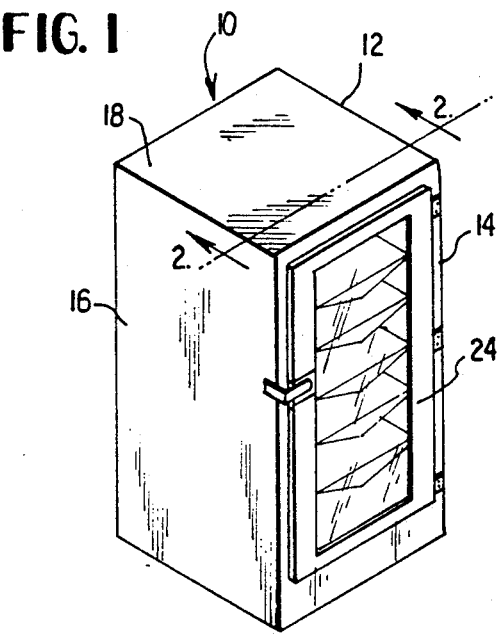
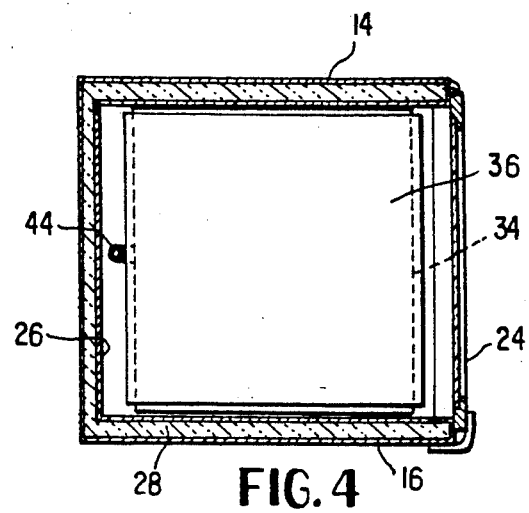
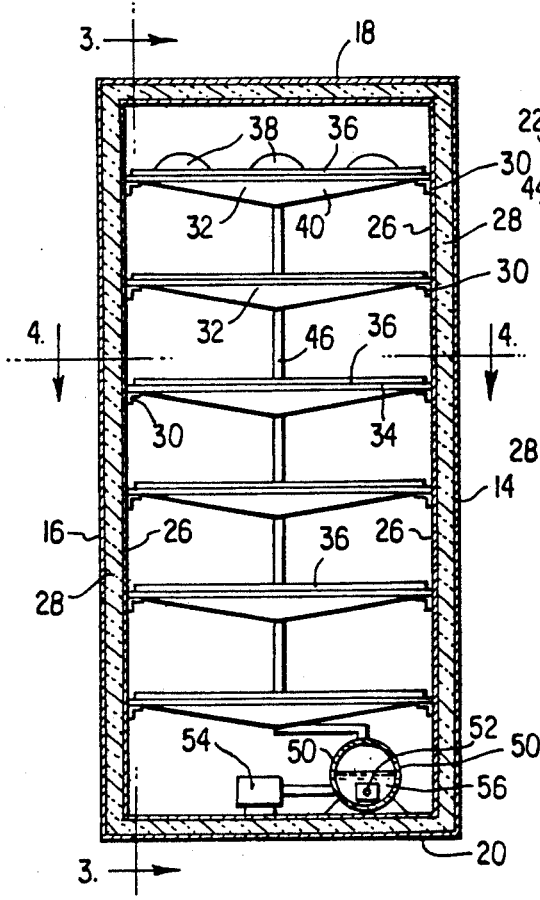
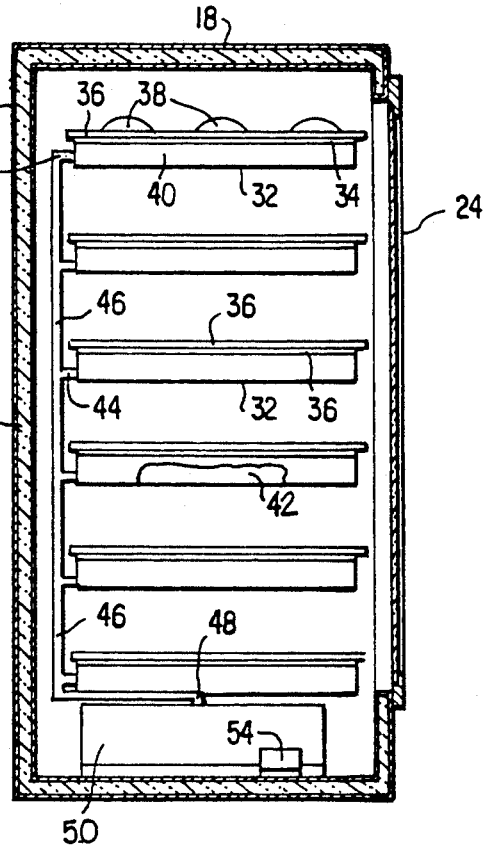

APPARATUS FOR HEATING FOOD ARTICLES

This application is a continuation of Ser. No. 07/581,548, filed Sep. 12, 1990, now abandoned.

BACKGROUND OF THE INVENTION

This invention relates to an apparatus for transferring heat to food articles and, more particularly, to a novel apparatus particularly adapted for holding previously cooked food articles quite near to a preferred temperature for prolonged time periods, and which can also be employed to initially cook food articles or to complete the cooking of food articles that have been previously partially cooked.

The novel method of cooking and holding food articles for which the present apparatus is utilized is disclosed in U.S. Pat. Nos. 4,210,675, 4,224,862 and 4,278,697 the contents of which are to be incorporated herein by reference in their entirety.

Briefly, the U.S. Department of Agriculture has long determined that there is considerable danger of spoilage and salmonella (food poisoning bacteria) development in food articles which are held for even short periods of time at temperatures ranging between 40° F. and 145° F. Prior art apparatus utilizing, for example, electrically heated air, steam, etc. have encountered problems in attempting to maintain warm food articles held in the apparatus at temperatures above 140° F. within a temperature range of +5° F. without also causing considerable undesired additional cooking or "overcooking" of them as pointed out in the aforementioned patents. The method comprises storing cooked meat or other food articles in a chamber having closure means intended to be repeatedly and frequently opened and closed, supporting the cooked food articles on support means located within the chamber, forcing a heated liquid heat-transferring medium through radiator means located adjacent to and on opposite sides of the support means, and maintaining the humidity within the chamber above that of the atmosphere outside of the chamber and the temperature above 140° F. and within a temperature range of +5° F. The apparatus disclosed in the aforementioned patents for practicing the aforestated method consisted basically of mounting a plurality of support means in vertical stacked relationship to each other. Each of the support means consisted of a plate to which is secured a serpentine coil for transferring the heated fluid. The coils of each support means are connected in series relationship to the pump and the sump containing the heated liquid. The aforedescribed support means, it has been discovered, is both inefficient and expensive to manufacture. The support means were not removable and the serial connection of all of the plates with their serpentine coils results in an unacceptably high pressure loss of fluid flowing through the coil and the necessity of using a large pump. In addition, inefficient heat transfer and poor heat distribution resulted from the prior art design and coil connection.

The support means themselves are also novel in that they are held in vertically, spaced-apart relationship on mounting means secured to the side walls of the cabinet. The support means each consist of an upper flat surface member and a lower surface member spaced from the upper member which, in its preferred form, is tapered to permit condensate water to drain to a removal outlet. The upper and lower members define a hollow, water tight interior. A single conduit member interconnects the interior of each of the support means and it itself is connected at its end to a steam generating means for supplying steam through the conduit means to each support means. The same conduit means also returns condensate water to the steam generating means during operation of a complete cycle. Water in the generating means is heated into steam by an electric heating element which is thermostatically controlled to maintain the food articles at a preselected temperature. Gas could also be used as a heat source.

It is therefore the primary object of the present invention to provide a superior apparatus for thawing, cooking, and holding food articles. -

It is another object of the present invention to provide a novel support for pans containing the food articles.

It is yet another object of the present invention to provide a novel single conduit header system for interconnecting a series of support means which ensures an even supply of heating fluid to the support means and the return of condensate water by gravity to the steam generating means thus eliminating the need for a pump.

Other objects and advantages of the present invention will become apparent and obvious from a study of the following description and accompanying drawings, which are merely illustrative of the present invention.

BRIEF DESCRIPTION OF THE DRAWINGS

FIG. 1 is a front elevational view of the thawing, cooking, holding apparatus for food articles of the present invention:

FIG. 2 is a side elevational view of the apparatus of FIG. 1 taken along the lines 2—2 of FIG. 1;

FIG. 3 is a side elevational view in cross-section taken along lines 3—3 of FIG. 2 of the present invention;

FIG. 4 is a cross-sectional view taken along the lines 4—4 of FIG. 2 of one of the pan supports of the present invention; and FIG. 5 is a perspective view of another embodiment of the support member of the present invention.

DETAILED DESCRIPTION OF THE INVENTION

Referring now to the drawings where like characters of reference indicate like elements of each of the several views, numeral 10 refers generally to the apparatus of the present invention for thawing, cooking, and holding various types of food articles.

The apparatus 10 shown in FIG. 1 comprises a cabinet member 12 with two vertical side walls 14, 16, a top wall 18, a bottom wall 20 and a back wall 22. A door 24 having a glass front is also provided The side walls 14 have an interior surface wall 26 spaced a distance from side wall 14 and insulation 28 is provided between the two. Brackets 30 are secured to the side walls 26 in spaced-apart relationship and hold a plurality of spaced apart supports 32.

The supports 32 have a flat upper surface member 34 on top of which are placed the pans 36 containing the food articles 38 to be heated. The supports 32 also have a tapered lower member 40 which is secured around its peripheral edge to the upper surface member 34 to thereby define a hollow, sealed interior 42. A pipe 44 communicates with the interior 42 and is located adjacent the bottom of the tapered lower member 40 to permit condensate water to drain therefrom as will be more fully described later.

The pipes 44 of each support 32 are connected together by means of a vertical conduit 46 which has its lower end connected to the outlet 48 of a steam generator 50. The steam generator 50 in the embodiment shown utilizes one or more electric heating elements 52 which are in turn connected to a temperature controller 54 settable to the desired predetermined temperature for the supports 32. A quantity of water 56 is placed in the steam generator 50 and a vacuum is pulled on the system to thereby remove most of the air from above the water 56, from the conduit 46, and from the hollow interiors 42 of the supports 32.

In operation, the temperature controller 54 is set at a preferred temperature which is the temperature the operator wants to achieve and/or maintain at the center of the food article 38. When the apparatus 10 is employed to initially cook food articles or to complete the cooking of food articles that have been previously partially cooked, this preferred temperature is the so-called "doneness temperature" of the food article 38, e.g. for chicken parts this "doneness temperature" is 165° F.; for beef parts, this "doneness temperature" ranges from 130° F. to 145° F. However, it should be understood that it is often preferred to hold food articles which have been previously fully cooked at a "holding temperature" that is lower than their "doneness temperature". With chicken parts, for example, the "holding temperature" is 150° F. or 36° F. below the "doneness temperature" of 186° F. Thus, after the temperature controller 54 is set at the desired preferred temperature, the heating elements 52 are energized and water 56 is turned into steam.

The steam enters the interiors 42 via the conduit 46 and thereby heats the upper surface members 34. Food articles 38 absorb heat from the pans 36 placed on the support members 32 thereby cooling the upper surface members 34 causing the steam to condense back into water. The condensate water is then collected at the bottom of the tapered lower member 40 and caused by gravity to flow out of pipe 44 back to the steam generator 50 again via conduit 46 and the cycle repeats itself As shown in FIG. 5, the supports 32 could consist of a plurality of spaced-apart pipes 58 connected at their ends by headers 60 and the water 56 could be replaced by a volatile substance such as a refrigerant. The water 56 could also be heated by gas, or steam or hot water carrying pipes passing therethrough.

Applicants have thus described in detail their novel apparatus for heating and cooling food articles which relies on steam to heat the food articles and a gravity return of the condensate water thus eliminating the necessity of a circulating pump.

It is apparent that many modifications and variations of this invention as hereinbefore set forth may be made without departing from the spirit and scope thereof The specific embodiments described are given by way of example only and the invention is limited only by the terms of the appended claims.

We claim:

1. An apparatus for transferring heat to food articles contained on trays within a chamber comprising:
   (a) a chamber having a plurality of vertically upstanding spaced-apart side walls and adjoining top and bottom walls, and at least one closure member permitting access of said trays to said chamber,
   (b) a plurality of vertically spaced-apart support means between said side walls, each of said support means having a flat upper surface member for receiving one of said tray adjacent thereto, a front side member, a rear side member adjacent one of said side walls, said rear side member having an outlet formed therein, and a lower surface member tapered toward said outlet in said rear side member, said upper and lower surface members and said side members forming a fluid tight enclosure,
   (c) thermostatically controlled fluid vapor generating means, and
   (d) conduit means extending between said rear side members and being adjacent one of said side walls for interconnecting the outlet of each of said support means to said fluid vapor generating means, said generating means supplying fluid vapor through said conduit means to said enclosure of each of said support means for heating said food articles, said conduit means serving to both transmit said fluid vapor to each of said support means and return condensate fluid back to said fluid vapor generating means; said support means, said conduit means and said fluid vapor generating means being sealed to the atmosphere to prevent dissipation of said condensate fluid.

2. Apparatus as set forth in claim 1 wherein said fluid is water.

3. Apparatus as set forth in claim 1 wherein said fluid is a refrigerant.

* * * * *